US011345817B2

(12) United States Patent
Thiria et al.

(10) Patent No.: US 11,345,817 B2
(45) Date of Patent: May 31, 2022

(54) TWO-PART CURABLE LIQUID SILICONE RUBBER COMPOSITION

(71) Applicant: Elkem Silicones USA Corp., East Brunswick, NJ (US)

(72) Inventors: Remi Thiria, Fort Mill, SC (US); Phylandra Gaither, Fort Mill, SC (US); Chris Carpen, Charlotte, NC (US); Brian Price, Rock Hill, SC (US)

(73) Assignee: ELKEM SILICONES USA CORP., East Brunswick, NJ (US)

( * ) Notice: Subject to any disclaimer, the term of this patent is extended or adjusted under 35 U.S.C. 154(b) by 199 days.

(21) Appl. No.: 16/915,672

(22) Filed: Jun. 29, 2020

(65) Prior Publication Data

US 2021/0002482 A1     Jan. 7, 2021

Related U.S. Application Data

(60) Provisional application No. 62/869,488, filed on Jul. 1, 2019.

(51) Int. Cl.
| C08L 83/04 | (2006.01) |
| B33Y 10/00 | (2015.01) |
| B33Y 70/00 | (2020.01) |
| B29C 64/314 | (2017.01) |
| B29C 64/106 | (2017.01) |
| B33Y 40/10 | (2020.01) |
| B29K 83/00 | (2006.01) |

(52) U.S. Cl.
CPC ............ *C08L 83/04* (2013.01); *B29C 64/106* (2017.08); *B29C 64/314* (2017.08); *B33Y 10/00* (2014.12); *B33Y 40/10* (2020.01); *B33Y 70/00* (2014.12); *B29K 2083/00* (2013.01); *C08L 2203/02* (2013.01); *C08L 2203/20* (2013.01); *C08L 2205/025* (2013.01); *C08L 2205/035* (2013.01); *C08L 2207/04* (2013.01)

(58) Field of Classification Search
CPC ...... C08L 83/00; C08L 83/04; C08L 2203/02; C08L 2205/025; C08L 2205/035; C08L 2207/04; B29C 64/314; B29C 64/106; B33Y 70/00
See application file for complete search history.

(56) References Cited

U.S. PATENT DOCUMENTS

| 5,145,933 A * | 9/1992 | Grisoni ................... C08L 83/04 528/31 |
| 5,169,727 A * | 12/1992 | Boardman ............. C09J 183/04 524/588 |
| 5,290,885 A * | 3/1994 | Vincent .................. C09J 183/04 525/478 |
| 5,859,094 A | 1/1999 | Conway et al. |
| 6,057,405 A * | 5/2000 | Wengrovius ............ C08L 83/00 524/588 |
| 9,145,474 B2 | 9/2015 | Arkles et al. |
| 2005/0113513 A1* | 5/2005 | Grisworld .............. C09J 183/04 528/15 |
| 2014/0275406 A1 | 9/2014 | Arkles et al. |

FOREIGN PATENT DOCUMENTS

WO     2013/137473 A1    9/2013

OTHER PUBLICATIONS

International Search Report for Application No. PCT/US2020/040158 dated Oct. 9, 2020.

* cited by examiner

*Primary Examiner* — Nahida Sultana
(74) *Attorney, Agent, or Firm* — McBee Moore & Vanik IP, LLC; Susan McBee; Chester Moore

(57) ABSTRACT

A two-part curable liquid silicone rubber composition is provided in which the first liquid composition and the second liquid composition yield, upon mixing, a curable liquid silicone rubber composition which, when cured, yields a silicone elastomer having an elongation-at-break value of at least 800%. The silicone elastomers of the invention comprise at least one alkenyl group-containing organopolysiloxane having two silicon-bonded alkenyl groups per molecule, at least one diorganohydrogensiloxy-terminated polydiorganosiloxane, at least one organosilicon crosslinker containing at least 3 silicon-bonded hydrogen atoms per molecule, at least one addition reaction catalyst, and at least one filler. Also provided are silicone elastomers having an elongation-at-break value of at least 800% and withstand elongation without breaking. An article for a medical device comprising a cured product of the two-part curable liquid silicone rubber compositions or the silicone elastomers of the invention are also provided.

20 Claims, No Drawings

TWO-PART CURABLE LIQUID SILICONE RUBBER COMPOSITION

CROSS-REFERENCE TO RELATED APPLICATIONS

This application claims the benefit of U.S. Provisional Application No. 62/869,488, filed on 1 Jul. 2019, which is incorporated by reference in its entirety.

FIELD OF THE INVENTION

The present invention relates to novel addition curable liquid silicone compositions which, when cured, yield silicone elastomers which exhibit very high elongation-at-break properties (from 800% to over 2000%) and high tensile strength. The present invention also relates to novel addition curable liquid silicone compositions which, when cured, yield silicone elastomers which exhibit very high elongation-at-break properties (from 800% to over 2000%), high tensile strength, and high durability.

BACKGROUND OF THE INVENTION

Silicone elastomers exhibit excellent heat resistance, cold resistance, hardness, physical strength, durability and safety, and are therefore used in a wide variety of applications, including medical materials. In recent years, flexible polymers have become increasingly important for many applications that impact daily life, including wearable devices, flexible displays, and devices for monitoring physiological signals.

In particular, silicone elastomers used in medical devices continue to expand with more complex shapes and performances requirements. Indeed, the physical properties of such cured silicone materials make them potentially suitable for applications requiring not only flexibility and strength, but also the ability to be formed into intricate shapes and survive high temperatures and sterilization without deforming.

Stretchable electronics and optoelectronics offering elastic responses to large strain deformations are also emerging and have attracted significant interest for use in a number of new applications, such as artificial electronic skins (e-skin), epidermal/biomedical devices (microfluidic), biometric lenses, electronic eye, wearable photovoltaic, smart clothing, medical diagnostics, sportswear, bendable displays, soft surgical tools and body sensor networks. The exponential use of such devices is predicted to lead to the "Internet of Things" (IoT) revolution in the next decade. Such growth of the IoT and wearables has created the need for electronics and sensor systems that are small, lightweight, mechanically flexible and low-power. These systems must also be able to conform to the shape of and survive the environment in which they must operate.

Indeed, many applications for medical and electronic devices, or disposable accessories made from silicone elastomers, subject the part to cyclic force or stress. The frequency, stress and strain of the cycle is dependent upon the use and the weight or load that is applied. Some examples in the medical domain include tubing in peristaltic drug delivery pumps, check valves, resuscitator bulbs, and diaphragm and prosthesis suction cups for limb attachment.

The property of flexibility can be easily obtained. Stretchability, on the other hand, represents a more challenging type of mechanics, in which the systems must accommodate large strain deformation typically of arbitrary form, including not only bending but also twisting, stretching, compressing and others.

Elongation-at-break is the percentage increase in length that a material will achieve before breaking. This figure is shown as a percentage and is usually measured using standard test method ASTM D412. A higher percentage usually indicates a better-quality material when combined with a good tensile strength.

It is also advantageous for silicone elastomers used in medical and electronic devices to be durable. Durability can be determined by stretching the elastomers and determining if the elastomers withstand elongation without breaking. Durability can also be determined by measuring how well the elastomer maintains its shape after stretching.

Material synthesis and structural design are core in the development of stretchable device components. Because of their molecular structure, silicone elastomers using polydimethylsiloxanes (PDMS) as precursors have been extensively used. Methods for forming silicone elastomers from two-component silicone systems (gel, RTV, LSR, HCR) are well established in the art. A typical two-component system based on an "addition" or hydrosilylation cure consists of a first part, which contains a vinyl-functional base polymer, a catalyst and optionally a reinforcing agent, and a second part, which typically contains the same vinyl-functional base polymer and a hydride-functional crosslinking polymer. When the two parts are mixed together, the crosslinking reaction commences and an elastomer forms. A three-dimensional (3D) network, involving polymers entanglements and covalent (chemical) crosslinks is then generated.

It has been shown, multiple times, that involving any kind of crosslinker (multifunctional linear polymers or resins bearing Si-alkenyl and/or SiH functions) in the curable silicone composition negatively alters the value of elongation-at-break (lower stretchability) of the cured silicone elastomer. In general, durometer and tensile strength increase however the cured silicone material becomes more brittle and less flexible.

Dow Corning Toray (WO 2013/137473) describes addition-reaction curable silicone elastomers exhibiting 500% or greater elongation-at-break, 40 or greater JIS-A hardness, and 7.0 Mpa or greater tensile strength. These silicone elastomers comprise (A1) a gum-like organopolysiloxane with an average of two or more silicon-bonded alkenyl groups only at the molecular terminals; (A2) a gum-like organopolysiloxane with an average of three or more alkenyl groups at the terminals and in side chain and an alkenyl group content at less than 0.1 wt. %; (B) an organopolysiloxane with a high vinyl content (0.5-20 wt. %); (C) an organopolysiloxane having an average or two or more silicon-bonded hydrogen atoms; (D) an inorganic filler; and (E) an addition reaction catalyst. Although these elastomers exhibit reasonable hardness, their stretchability is limited.

Gelest (U.S. Pat. No. 9,145,474; US 2014/0275406) discloses methods for producing linear, step-growth siloxane elastomers comprising a two part system, the first part comprising a monodisperse telechelic siloxane (preferably vinyl end-groups at each end) and a hydrosilylation catalyst; the second part comprising a second monodisperse telechelic (preferably hydride end-groups at each end) siloxane and a dual functional linear monodisperse siloxane having two different polymer termini (preferably hydride/vinyl). Reaction of the two parts in an amount to maintain a 1:1 ratio of the end groups is critical and no covalent cross-linking is present. Very high elongation-at-break values were obtained (~5000%) but these elastomers require the use of non-standard bi-functional precursors.

Thus, while a number of approaches have been adopted to try to increase the elongation-at-break of silicone elastomers without compromising durability and tensile strength, there remains a need for durable silicone elastomers with high stretchability (e.g., elongation-at-break values of 800% or greater).

BRIEF SUMMARY OF THE INVENTION

As a result of diligent research, the inventors of the present invention found that it was possible to solve the above-mentioned problems by using a two-part curable liquid silicone rubber composition comprising a first liquid composition comprising components (A), (B), (C), (E), and (F), but not (D) and a second liquid composition comprising components (A), (E), and (D), but not (B) and not (C) and not (F), in which the first liquid composition and the second liquid composition are stored separately and yield, upon mixing, a curable liquid silicone rubber composition X which, when cured, yields a highly stretchable silicone elastomer Z having an elongation-at-break value of at least 800%, preferably at least 1200%, measured according to ASTM D-412. The curable liquid silicone rubber composition X comprises the following components:

(A) 100 parts by weight of at least one alkenyl group-containing organopolysiloxane A having two silicon-bonded alkenyl groups per molecule,
(B) at least one diorganohydrogensiloxy-terminated polydiorganosiloxane CE,
(C) at least one organosilicon crosslinker XL containing at least 3 silicon-bonded hydrogen atoms per molecule,
(D) at least one addition reaction catalyst D, and
(E) from 1 to 500 parts by weight of at least one filler E, and
(F) from 0 to 10 parts by weight of at least one cure rate modifier F.

Component (A) can be the same or different in the first and second liquid compositions. Component (E) can also be the same or different in the first and second liquid compositions.

The amounts of the alkenyl group-containing organopolysiloxane A, the diorganohydrogensiloxy-terminated polydiorganosiloxane CE, and the organosilicon crosslinker XL within the curable liquid silicone rubber composition X are determined such that:

1) the value of the ratio RHalk is 1.00<RHalk<1.35, where RHalk=nH/tAlk, and:
   nH=number of moles of hydrogen atom directly bonded to a silicon atom of said liquid silicone rubber composition X; and
   tAlk=number of moles of alkenyl groups directly bonded to a silicon atom of said liquid silicone rubber composition X, and
2) the % molar ratio RHCE is within the range of 50%≤RHCE<98%, where RHCE=nHCE/(nHCE+nHXL)×100, and:
   a) nHCE is the number of moles of hydrogen atom directly bonded to a silicon atom of the diorganohydrogensiloxy-terminated polydiorganosiloxane CE, and
   b) nHXL=is the number of moles of hydrogen atom directly bonded to a silicon atom of the organosilicon crosslinker XL.

In some embodiments, the organosilicon crosslinker XL containing at least 3 silicon-bonded hydrogen atoms per molecule is an organohydrogenpolysiloxane comprising from 10 to 500 silicon atoms within each molecule, and the ratio α is within the range 0.01≤α≤0.957, where α=d/(ΣSi), and:
d=number of H atoms directly linked to a Si atom per molecule, and
ΣSi is the sum of silicon atoms per molecule.

In some embodiments, the organosilicon crosslinker XL containing at least 3 silicon-bonded hydrogen atoms per molecule is an organohydrogenpolysiloxane comprising from 10 to 250 silicon atoms within each molecule and the ratio α is within in the range of 0.10≤α≤0.75.

In some embodiments, the organosilicon crosslinker XL containing at least 3 silicon-bonded hydrogen atoms per molecule is an organohydrogenpolysiloxane comprising from 0.45-40% SiH by weight.

In some embodiments, the organosilicon crosslinker XL comprises:
(i) at least 3 siloxy units of formula (XL-1) which may be identical or different:

$$(H)(Z)_e SiO_{(3-e)/2} \quad (XL-1)$$

in which:
the symbol H represents a hydrogen atom,
the symbol Z represents an alkyl having from 1 to 8 carbon atoms inclusive, and
the symbol e is equal to 0, 1 or 2, preferably e is equal to 1 or 2; and
(ii) at least one, and preferably from 1 to 550 of siloxy unit(s) of formula (XL-2):

$$(Z)_g SiO_{(4-g)/2} \quad (XL-2)$$

in which:
the symbol Z represents an alkyl having from 1 to 8 carbon atoms inclusive, and
the symbol g is equal to 0, 1, 2 or 3, preferably g is equal to 2;
in which Z in XL-1 and XL-2 can be the same or different.

In some embodiments, the organosilicon crosslinker XL comprises from 3 to 60 siloxy units of formula (XL-1) and from 1 to 250 siloxy unit(s) of formula (XL-2).

In some embodiments, Z is selected from methyl, ethyl, propyl and 3,3,3-trifluoropropyl groups, cycloalkyl groups, and aryl groups. In some embodiments, Z is a cycloalkyl group selected from cyclohexyl, cycloheptyl, and cyclooctyl groups. In other embodiments, Z is an aryl group selected from the group consisting of xylyl, tolyl, and phenyl groups. In other embodiments, Z is a methyl group.

In some embodiments, the at least one alkenyl group-containing organopolysiloxane A is of the following formula (1):

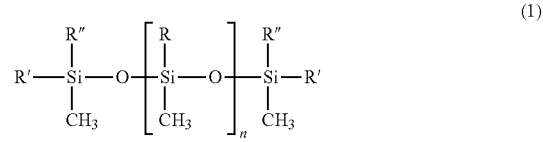

in which:
n is an integer ranging from 1 to 1000, preferably n is an integer ranging from 50 to 1000;
R is a $C_1$ to $C_{20}$ alkyl group such as a methyl, ethyl, propyl, trifluoropropyl, or aryl group, preferably R is a methyl group;
R' is a $C_2$ to $C_{20}$ alkenyl group such as a vinyl, allyl, hexenyl, decenyl, or tetradecenyl group, preferably R' is a vinyl group; and R″ is a $C_1$ to $C_{20}$ alkyl group such as a methyl, ethyl, propyl, trifluoropropyl, or aryl group, preferably R″ is a methyl group.

In some embodiments, the diorganohydrogensiloxy-terminated polydiorganosiloxane CE is of the following formula (2):

$$\begin{array}{c} R'' \\ | \\ H-Si-O \\ | \\ CH_3 \end{array} \left[ \begin{array}{c} R \\ | \\ Si-O \\ | \\ CH_3 \end{array} \right]_n \begin{array}{c} R'' \\ | \\ Si-H \\ | \\ CH_3 \end{array} \quad (2)$$

in which:
R and R″ are independent and are selected from a $C_1$ to $C_{20}$ alkyl group, and
n is an integer ranging from 1 to 500. preferably n is an integer ranging from 2 to 100, more preferably n is an integer ranging from 3 to 50.

In some embodiments, R and R″ are independently selected from methyl, ethyl, propyl, trifluoropropyl and phenyl. Preferably, R and R″ are methyl.

In some embodiments, the catalyst D is a platinum group metal-containing catalyst.

In some embodiments, the filler E is a reinforcing filler E1, a thermally conductive filler E2, an electrically conductive filler E3, or mixtures thereof. In some embodiments, the filler E is present in the curable liquid silicone rubber composition X in an amount from 1 to 100 parts by weight, from 1 to 50 parts by weight, or from 1 to 25 parts by weight.

In some embodiments, the cure rate modifier F is a crosslinking inhibitor F1 and/or a crosslinking retardant F2. In some embodiments, the cure rate modifier F is present in an amount from 0.001 to 5 parts by weight, from 0.005 to 2 parts by weight, or from 0.01 to 0.5 parts by weight.

In some embodiments, the two-part curable liquid silicone rubber composition further comprises component(s):
(G) from 0 to 2 parts by weight of at least one thickener G1 or at least one rheology modifier G2, and/or
(H) from 0 to 10 parts of at least one additive H.

In some embodiments, components (F), (G), and (H) are not present in the two-part curable liquid silicone rubber composition of the invention.

In some embodiments, the elongation-at-break value of the silicone elastomer Z obtained by curing the two-part curable liquid silicone rubber composition of the invention is at least 1000%, preferably at least 1200%. In some embodiments, the elongation-at-break value of the silicone elastomer Z obtained by curing the two-part curable liquid silicone rubber composition of the invention is less than 5000%.

In some embodiments, the % molar ratio RCHE of the curable liquid silicone rubber composition X is within the range of 76%≤RHCE<95%. In some embodiments, the % molar ratio RCHE is within the range of 86%≤RHCE≤94%.

It has been advantageously demonstrated that silicone elastomers Z obtained by curing the two-part curable liquid silicone rubber composition of the invention in which the ratio α for crosslinker XL is less than 0.20, and the % molar ratio RCHE is within the range of 86%≤RHCE≤96% are highly durable as demonstrated by withstanding elongation without breaking.

Similarly, silicone elastomers Z obtained by curing the two-part curable liquid silicone rubber composition of the invention in which the ratio α for crosslinker XL is greater than 0.22, and the % molar ratio RCHE is within the range of 78%≤RHCE≤94% are highly durable as demonstrated by withstanding elongation without breaking.

In some embodiments, the value of the ratio RHalk is 1.10≤RHalk<1.25. In other embodiments, the value of the ratio RHalk is 1.10≤RHalk≤1.20.

Also provided is a silicone elastomer having an elongation-at-break value of at least 800% measured according to ASTM D-412, which is obtained by curing the two-part curable liquid silicone rubber compositions described herein.

In particular, silicone elastomers are provided having an elongation-at-break value of at least 800% measured according to ASTM D-412, comprising:
(A) 100 parts by weight of at least one alkenyl group-containing organopolysiloxane A having two silicon-bonded alkenyl groups per molecule,
(B) at least one diorganohydrogensiloxy-terminated polydiorganosiloxane CE,
(C) at least one organosilicon crosslinker XL containing at least 3 silicon-bonded hydrogen atoms per molecule,
(D) at least one addition reaction catalyst D, and
(E) from 1 to 500 parts by weight of at least one filler E,
(F) from 0 to 10 parts by weight of at least one cure rate modifier F.

The amounts of the alkenyl group-containing organopolysiloxane A, the diorganohydrogensiloxy-terminated polydiorganosiloxane CE, and the organosilicon crosslinker XL are determined such that:
1) the value of the ratio RHalk is 1.00<RHalk<1.35, and
2) the % molar ratio RHCE is within the range of 50%≤RHCE<98%.

Also provided are articles, such as for a medical device, comprising a cured product of the two-part curable liquid silicone rubber composition or the silicone elastomer described herein.

DETAILED DESCRIPTION OF THE INVENTION

Before the subject disclosure is further described, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

As used herein, the term "silicone rubber" includes the crosslinked product of any crosslinkable silicone composition. The terms "silicone rubber" and "silicone elastomer" may be used interchangeably.

As used herein, the terms "crosslinked" and "cured" may be used interchangeably and refer to the reaction that occurs when the two-part system is combined and allowed to react, resulting in the cured silicone elastomer.

As used herein, the term "alkenyl" is understood to mean an unsaturated, linear or branched hydrocarbon chain, substituted or not, having at least one olefinic double bond, and more preferably a single double bond. Preferably, the "alkenyl" group has 2 to 8 carbon atoms and better still 2 to 6. This hydrocarbon chain optionally includes at least one heteroatom such as O, N, S. Preferred examples of "alkenyl" groups are vinyl, allyl and homoallyl groups, vinyl being particularly preferred.

As used herein, "alkyl" denotes a saturated, linear or branched hydrocarbon chain, possibly substituted (e.g. with one or more alkyls), with preferably 1 to 10 carbon atoms, for example 1 to 8 carbon atoms and better still 1 to 4 carbon atoms. Examples of alkyl groups are notably methyl, ethyl, isopropyl, n-propyl, tert-butyl, isobutyl, n-butyl, n-pentyl, isoamyl and 1,1-dimethylpropyl.

To achieve the objective of obtaining a highly stretchable silicone rubber (i.e., a silicone rubber having an elongation-at break value of at least 800%), the Applicant demonstrated, to its credit, entirely surprisingly and unexpectedly, that the combination of (A) an alkenyl group-containing organopolysiloxane A having two silicon-bonded alkenyl groups per molecule, (B) at least one diorganohydrogensiloxy-terminated polydiorganosiloxane chain extender CE, and (C) at least one organosilicon crosslinker XL containing at least 3 silicon-bonded hydrogen atoms per molecule in such amounts to result in: 1) the molar ratio of hydrogen atoms to alkenyl groups within the silicon elastomer (RHalk) are between 1.00 and 1.35 and 2) the percentage of hydrogen atoms directly bonded to a silicon atom in CE out the number of moles of hydrogen atoms directly bonded to a silicon atom in both CE and XL combined (RHCE) is between 50% and 98% makes it possible to overcome problems that were not solved by the prior art.

Preferably, the two-part curable liquid silicone rubber composition of the invention comprises a first liquid composition comprising components (A), (B), (C), (E), and (F), but not (D) and a second liquid composition comprising components (A), (E), and (D), but not (B) and not (C) and not (F), in which the components are as follows:

(A) at least one alkenyl group-containing organopolysiloxane A having two silicon-bonded alkenyl groups per molecule, (B) at least one diorganohydrogensiloxy-terminated polydiorganosiloxane chain extender CE, (C) at least one organosilicon crosslinker XL containing at least 3 silicon-bonded hydrogen atoms per molecule, (D) at least one addition reaction catalyst D, (E) at least one filler E, (F) optionally, at least one cure rate modifier F, (G) optionally, at least one thickener G1 or at least one rheology modifier G2, and (H) optionally at least one additive H.

As discussed above, the amounts of A, CE, and XL included in the two-part curable liquid silicone rubber composition are preferably selected to result in: 1) the molar ratio of hydrogen atoms to alkenyl groups within the silicon elastomer (RHalk) is between 1.00 and 1.35; and 2) the percentage of hydrogen atoms directly bonded to a silicon atom in CE out the number of moles of hydrogen atoms directly bonded to a silicon atom in both CE and XL combined (RHCE) is 50-98%.

The first liquid composition and the second liquid composition are stored separately and yield, upon mixing, a curable liquid silicone rubber composition X which, when cured, yields a silicone elastomer Z having an elongation-at-break value of at least 800% measured according to ASTM D-412. In some embodiments, the first liquid composition and the second liquid composition yield, upon mixing, a curable liquid silicone rubber composition X which, when cured, yields a silicone elastomer Z having an elongation-at-break value of at least 1000%, at least 1100%, at least 1200%, at least 1300%, at least 1400%, at least 1500%, at least 1600%, at least 1700%, at least 1800%, at least 1900%, or at least 2000% measured according to ASTM D-412.

ASTM D412 measures the elasticity of a material while under tensile strain, as well as its behavior after testing when the material is no longer being stressed. Though ASTM D412 measures many different properties, the following are the most common:

Tensile Strength: the maximum tensile stress applied in stretching a specimen to rupture.

Tensile Stress at a Given Elongation: the stress required to stretch the uniform cross-section of a test specimen to a given elongation.

Ultimate Elongation: the elongation at which rupture occurs in the application of continued tensile stress.

Tensile Set: the extension remaining after a specimen has been stretched and allowed to retract in a specified manner, expressed as a percentage of the original length.

The curable liquid silicone rubber composition of the invention comprises at least one alkenyl group-containing organopolysiloxane A having two silicon-bonded alkenyl groups per molecule. In some embodiments, the curable liquid silicone rubber composition of the invention comprises more than one alkenyl group-containing organopolysiloxane A having two silicon-boned alkenyl groups per molecule. For example, the curable liquid silicone rubber composition of the invention may comprise two alkenyl group-containing organopolysiloxanes A (A1 and A2) each having two silicon-bonded alkenyl groups per molecule.

In some embodiments, the at least one alkenyl group-containing organopolysiloxane A comprises:

two siloxy units of formula (A-1):

$$(Alk)(R)_2SiO_{1/2} \quad (A-1)$$

in which: the symbol "Alk" represents a $C_2$ to $C_{20}$ alkenyl group, such as a vinyl, allyl, hexenyl, decenyl, or tetradecenyl group, preferably a vinyl group hydrogen atom, and the symbol R represents a $C_1$ to $C_{20}$ alkyl group, such as a methyl, ethyl, propyl, trifluoropropyl, or aryl group, preferably a methyl group, and other siloxy units of formula (A-2):

$$(L)_g SiO_{(4-g)/2} \quad (A-2)$$

in which the symbol L represents a $C_1$ to $C_{20}$ alkyl group, such as a methyl, ethyl, propyl, trifluoropropyl, or aryl group, preferably a methyl group, and the symbol g is equal to 0, 1, 2 or 3, in which each instance of L can be the same or different.

In some preferred embodiments, the at least one alkenyl group-containing organopolysiloxane A is of the following formula (1):

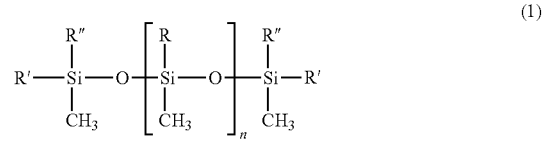

in which:

n is an integer ranging from 1 to 1000, preferably from 50 to 1000,

R is a $C_1$ to $C_{20}$ alkyl group, such as a methyl, ethyl, propyl, trifluoropropyl, or aryl group, preferably a methyl group, R' is a $C_2$ to $C_{20}$ alkenyl group, such as a vinyl, allyl, hexenyl, decenyl, or tetradecenyl group, preferably a vinyl group, and R" is a $C_1$ to $C_{20}$ alkyl group, such as a methyl, ethyl, propyl, trifluoropropyl, or aryl group, preferably a methyl group.

In a preferred embodiment, the at least one alkenyl group-containing organopolysiloxane A is one or more α,ω-vinyl polydimethylsiloxane(s), more preferably, one or more linear α,ω-vinyl polydimethylsiloxane(s).

In some embodiments, the viscosity of the at least one alkenyl group-containing organopolysiloxane A is between about 50 to about 100,000 mPa·s., preferably between about 1,000 to about 50,000 mPa·s., more preferably between about 2,500 to about 25,000 mPa·s. In some embodiments, the curable liquid silicone rubber composition of the invention comprises at least one alkenyl group-containing organopolysiloxane A1 having a viscosity between about 100 to about 10,000 mPa·s. and at least one alkenyl group-containing organopolysiloxane A2 having a viscosity between about 5,000 to about 100,000 mPa·s. In a preferred embodiment, the viscosity of the at least one alkenyl group-containing organopolysiloxane A1 is between about 500 to about 7,500 mPa·s., more preferably between about 1,000 to about 5,000 mPa·s. In a preferred embodiment, the viscosity of the at least one alkenyl group-containing organopolysiloxane A2 is between about 7,500 to about 50,000 mPa·s., more preferably between about 10,000 to about 25,000 mPa·s.

In some embodiments, the molecular weight of the at least one alkenyl group-containing organopolysiloxane A is between about 1,000 g/mol to about 80,000 g/mol, preferably between about 10,000 g/mol to about 70,000 g/mol, more preferably between about 20,000 g/mol to about 60,000 g/mol. In some embodiments, the curable liquid silicone rubber composition of the invention comprises at least one alkenyl group-containing organopolysiloxane A1 having a molecular weight between about 1,000 to about 50,000 g/mol and at least one alkenyl group-containing organopolysiloxane A2 having a viscosity between about 5,000 to about 80,000 g/mol. In a preferred embodiment, the molecular weight of the at least one alkenyl group-containing organopolysiloxane A1 is between about 5,000 to about 40,000 g/mol, more preferably between about 10,000 to about 30,000 g/mol. In a preferred embodiment, the molecular weight of the at least one alkenyl group-containing organopolysiloxane A2 is between about 15,000 to about 75,000 g/mol, more preferably between about 30,000 to about 60,000 g/mol.

The at least one alkenyl group-containing organopolysiloxane A is preferably linear.

The curable liquid silicone rubber composition of the invention further comprises at least one diorganohydrogensiloxy-terminated polydiorganosiloxane chain extender CE. The at least one diorganohydrogensiloxy-terminated polydiorganosiloxane chain extender CE can be included in the curable liquid silicone rubber composition in an amount from about 0.1% to about 20%, preferably from about 0.5% to about 15%, preferably from about 0.5% to about 10% by weight of the total composition.

In some embodiments, the diorganohydrogensiloxy-terminated polydiorganosiloxane CE is of the following formula (2):

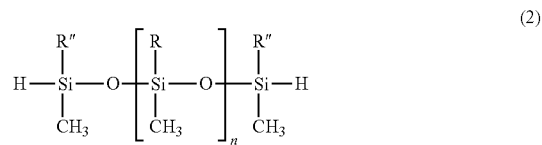

in which:

R and R" are independently a $C_1$ to $C_{20}$ alkyl group, preferably R and R" are independently chosen from the group consisting of: methyl, ethyl, propyl, trifluoropropyl and aryl, and most preferably R and R" are methyl, and n is an integer ranging from 1 to 500, preferably from 2 to 100, and more preferably from 3 to 50.

In some embodiments, the viscosity of the at least one diorganohydrogensiloxy-terminated polydiorganosiloxane CE is between about 1 to about 500 mPa·s., preferably between about 2 to about 100 mPa·s., more preferably between about 4 to about 50 mPa·s. or between about 5 to about 20 mPa·s.

In some embodiments, the molecular weight of the at least one diorganohydrogensiloxy-terminated polydiorganosiloxane CE is between about 100 to about 5,000 g/mol, preferably between about 250 to about 2,500 g/mol, more preferably between about 500 to about 1,000 g/mol.

The curable liquid silicone rubber composition of the invention further comprises at least one organosilicon crosslinker XL containing at least 3 silicon-bonded hydrogen atoms per molecule. In some embodiments, the organosilicon crosslinker XL containing at least 3 silicon-bonded hydrogen atoms per molecule is an organohydrogenpolysiloxane comprising from 10 to 500 silicon atoms within each molecule, preferably from 10 to 250 silicon atoms within each molecule.

The at least one organosilicon crosslinker XL can be included in the curable liquid silicone rubber composition in an amount from about 0.01% to about 5%, preferably from about 0.05% to about 2%, preferably from about 0.1% to about 1% by weight of the total composition.

The organosilicon crosslinker XL is selected such that the ratio α (d/(ΣSi)) is within the range 0.01≤α≤0.957, in which d=number of H atoms directly linked to a Si atom per molecule, and ΣSi is the sum of silicon atoms per molecule. In a preferred embodiment, the ratio α is within the range 0.10≤α≤0.75. In other preferred embodiments, the ratio α is within the range 0.15≤α≤0.30.

The organosilicon crosslinker XL preferably contains between 0.45-40% SiH by weight, more preferably between 0.5-35% SiH by weight, more preferably between 0.5%-15% SiH by weight or between 5% to 12% SiH by weight.

In some embodiments, the organosilicon crosslinker XL comprises:

(i) at least 3 siloxy units of formula (XL-1) which may be identical or different:

in which:

H represents a hydrogen atom,

Z represents an alkyl having from 1 to 8 carbon atoms inclusive, and e is equal to 0, 1 or 2;

and/or (ii) at least one, and preferably from 1 to 550 of siloxy unit(s) of formula (XL-2):

in which:

Z represents an alkyl having from 1 to 8 carbon atoms inclusive, and g is equal to 0, 1, 2 or 3.

In some embodiments, Z in XL-1 and/or XL-2 is selected from methyl, ethyl, propyl and 3,3,3-trifluoropropyl groups, cycloalkyl groups, such as cyclohexyl, cycloheptyl or cyclooctyl groups, and aryl groups such as xylyl, tolyl and phenyl groups. Preferably, Z is a methyl group. However, Z in XL-1 and XL-2 may be the same or different.

In a preferred embodiment, e in XL-1 is 1 or 2.

In a preferred embodiment, g in XL-2 is 2.

In a preferred embodiment, the organosilicon crosslinker XL comprises from 3 to 60 siloxy units of formula (XL-1) and from 1 to 250 siloxy unit(s) of formula (XL-2).

In some embodiments, the curable liquid silicone rubber composition of the invention does not contain organopolysiloxanes having silicon-bonded alkenyl groups in side molecular chains.

The amounts of the alkenyl group-containing organopolysiloxane A, the diorganohydrogensiloxy-terminated polydiorganosiloxane CE, and the organosilicon crosslinker XL included in the curable liquid silicone rubber compositions of the invention are determined such that 1) the molar ratio of hydrogen atoms to alkenyl groups within the silicon elastomer (RHalk) is between 1.00 and 1.35 and 2) the percentage of hydrogen atoms directly bonded to a silicon atom in CE out the number of moles of hydrogen atoms directly bonded to a silicon atom in both CE and XL combined (RHCE) is between 50 and 98%.

The molar ratio of hydrogen atoms to alkenyl groups (RHalk) can be determined using the formula:

$$RHalk = nH/tAlk,$$

in which:

nH=number of moles of hydrogen atom directly bonded to a silicon atom of the components of the curable liquid silicone rubber composition X, and tAlk=number of moles of alkenyl groups directly bonded to a silicon atom of the components of the curable liquid silicone rubber composition X.

The value of RHalk in the curable liquid silicone rubber compositions of the invention is advantageously between 1.00 and 1.35. It has been determined that if the value of RHalk is 1.00 or less, the resulting cured compositions are gel-like in structure. Similarly, if the value of RHalk is 1.35 or greater, the resulting cured compositions also tend to be gel-like in structure. Preferably, the value of RHalk in the curable liquid silicone rubber compositions of the invention is $1.00 < RHalk < 1.35$. Alternatively, the value of RHalk in the curable liquid silicone rubber compositions of the invention is $1.05 \leq RHalk \leq 1.30$. In another alternative, the value of RHalk in the curable liquid silicone rubber compositions of the invention is $1.05 < RHalk < 1.30$. In another alternative, the value of RHalk in the curable liquid silicone rubber compositions is $1.10 \leq RHalk \leq 1.25$, preferably $1.10 \leq RHalk < 1.25$, more preferably $1.10 \leq RHalk \leq 1.20$.

In addition to the RHalk value, the molar percentage of hydrogen atoms directly bonded to a silicon atom in the diorganohydrogensiloxy-terminated polydiorganosiloxane CE to the hydrogen atoms directly bonded to a silicon atom in both CE and in the organosilicon crosslinker XL (i.e., the RHCE value) is another important feature of the curable liquid silicone rubber compositions of the invention.

The molar percentage RHCE can be determined using the formula:

$$RHCE = nHCE/(nHCE + nHXL) \times 100$$

in which:

nHCE is the number of moles of hydrogen atom directly bonded to a silicon atom of the diorganohydrogensiloxy-terminated polydiorganosiloxane CE, and nHXL= is the number of moles of hydrogen atom directly bonded to a silicon atom of the organosilicon crosslinker XL.

The value of RHCE is advantageously within the range of $50\% \leq RHCE < 98\%$. It has been determined that if the value of RHCE is 98% or greater, the resulting cured compositions are gel-like in structure. If the value of RHCE is less than 50%, the resulting cured compositions become more brittle. In some embodiments, the value of RHCE is within the range of $76\% \leq RHCE < 95\%$. In some embodiments, the value of RHCE is within the range of $86\% \leq RHCE \leq 94\%$.

In some embodiments, the cured silicone elastomers of the invention are highly durable. For example, in some embodiments, the cured silicone elastomers of the invention withstand elongation without breaking and/or maintain their shape after elongation. It has been found that cured silicone elastomers obtained by curing the two-part liquid silicone rubber compositions of the invention in which the ratio α is less than 0.20 and the % molar ratio RCHE is within the range of $86\% \leq RHCE \leq 96\%$ withstand elongation without breaking. In addition, cured silicone elastomers obtained by curing the two-part liquid silicone rubber compositions of the invention in which the ratio α is greater than 0.22 and the % molar ratio RCHE is within the range of $78\% \leq RHCE \leq 94\%$ withstand elongation without breaking.

The liquid curable silicone rubber composition of the invention further comprises at least one addition reaction catalyst D. The addition reaction catalyst D can be included at any amount capable of curing the composition. For example, the addition reaction catalyst D can be included at an amount where the quantity of a platinum group metal in catalyst D is from 0.01 to 500 parts per weight per 1,000,000 parts by weight of the alkenyl group-containing organopolysiloxane A.

The catalyst D may notably be chosen from compounds of platinum and rhodium. It is possible, in particular, to use platinum complexes and an organic product described in U.S. Pat. Nos. 3,159,601, 3,159,602, 3,220,972 and European patents EP-A-0 057 459, EP-A-0 118 978 and EP-A-0 190 530, complexes of platinum and vinylorganosiloxanes described in U.S. Pat. Nos. 3,419,593, 3,715,334, 3,377,432 and 3,814,730. In a preferred embodiment, the addition reaction catalyst D is a platinum group metal-containing catalyst.

The liquid curable silicone rubber composition further comprises at least one filler E. In some embodiments, the filler E is selected from the group consisting of a reinforcing filler E1, a thermally conductive filler E2, an electrically conductive filler E3, and mixtures thereof.

In some embodiments, the reinforcing filler E1 is selected from silicas and/or aluminas, preferably selected from silicas.

As silicas that may be used, fillers are envisaged characterized by a fine particle size often less than or equal to 0.1 μm and a high ratio of specific surface area to weight, generally lying within the range of approximately 50 square meters per gram to more than 300 square meters per gram. Silicas of this type are commercially available products and are well known in the art of the manufacture of adhesive silicone compositions. These silicas may be colloidal silicas, silicas prepared pyrogenically (silicas called combustion or fumed silicas) or by wet methods (precipitated silicas) of mixtures of these silicas.

The chemical nature and the method for preparing silicas capable of forming the filler E are not important for the purpose of the present invention, provided the silica is capable of exerting a reinforcing action on the final adhesive. Cuts of various silicas may of course also be used.

These silica powders have a mean particle size generally close to or equal to 0.1 μm and a BET specific surface area greater than 50 m²/g, preferably between 50 and 400 m²/g, notably between 150 and 350 m²/g.

These silicas are optionally:
pretreated with the aid of at least one compatibilizing agent chosen from the group of molecules that satisfy at least two criteria:
have a high interaction with silica in the region of its hydrogen bonds with itself and with the surrounding silicone oil;
are themselves, or their degradation products, easily removed from the final mixture by heating under vacuum in a gas flow, and compounds of low molecular weight are preferred;
and/or treated in situ:
in a specific manner with the aid of at least one untreated silica,
and/or in a complementary manner by using at least one compatibilization agent of nature similar to that which can be used in pre-treatment and as defined above.

In situ treatment of the silica filler is understood to mean putting the filler and the compatibilizing agent in the presence of at least one portion of the preponderant silicone polymer referred to above.

The compatibilizing agent is chosen according to the treatment method (pre-treatment or in situ) and may for example be selected from the group comprising:
chlorosilanes,
polyorganocyclosiloxanes, such as octamethylcyclosiloxane (D4),
silazanes, preferably disilazanes, or mixtures thereof, hexamethyldisilazane (HMDZ) being the preferred silazane and that may be associated with divinyltetramethyl-disilazane,
polyorganosiloxanes having, per molecule, one or more hydroxyl groups linked to silicon,
amines such as ammonia or alkylamines with a low molecular weight such as diethylamine,
organic acids with a low molecular weight such as formic or acetic acids,
and mixtures thereof.

In the case of in situ treatment, the compatibilizing agent is preferably used in the presence of water.

For more details in this respect, reference may be made for example to patent FR-B-2 764 894.

As a variant, it is possible to use compatibilizing methods of the prior art providing early treatment by silazane (e.g. FR-A-2 320 324) or a delayed treatment (e.g. EP-A-462 032) bearing in mind that according to the silica used their use will in general not make it possible to obtain the best results in terms of mechanical properties, in particular extensibility, obtained by treatment on two occasions according to the invention.

As a reinforcing alumina that may be used as the filler E, a highly dispersible alumina is advantageously employed, doped or not in a known manner. It is of course possible also to use cuts of various aluminas. As a non-limiting examples of such aluminas, reference may be made to aluminas A 125, CR 125, D 65CR from the Baikowski Company. Preferably, the reinforcing filler used is a combustion silica, taken alone or mixed with alumina.

As regards weight, it is preferred to employ a quantity of reinforcing filler E1 of between 5 and 30%, preferably between 6 and 25%, more preferably between 7 and 20% by weight based on all the constituents of the composition.

The use of a complementary filler such as a thermally conductive filler E2 and/or an electrically conductive filler E3 may be envisaged according to the invention.

The silicone elastomers of the invention may also contain at least one cure rate modifier F. The cure rate modifier F may be a crosslinking inhibitor F1 and/or a crosslinking retardant F2, for example.

Crosslinking inhibitors are also well known. Examples of crosslinking inhibitors F1 that may be used as the cure rate modifier F include:
polyorganosiloxanes, advantageously cyclic and substituted by at least one alkenyl group, tetramethylvinyltetrasiloxane being particularly preferred,
pyridine,
phosphine and organic phosphites,
unsaturated amides,
alkylated maleates,
acetylenic alcohols.

These acetylenic alcohols (cf. FR-B-1 528 464 and FR-A-2 372 874), which form part of the preferred thermal blockers of the hydrosilylation reaction, have the formula:

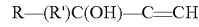

in which:
R is a linear or branched alkyl radical, or a phenyl radical;
R' is H or a linear or branched alkyl radical, or phenyl radical;
the radicals R, R' and the carbon atom situated in the alpha position of the triple bond being possibly able to form a ring;
the total number of carbon atoms contained in R and R' being at least 5, preferably 9 to 20.

Said alcohols are preferably chosen from those having a boiling point about 250° C. As examples, mention may be made of:
1-ethynyl-1-cyclohexanol (ECH);
methyl-3 dodecyne-1 ol-3;
trimethyl-3,7,11 dodecyne-1 ol-3;
diphenyl-1,1 propyne-2 ol-1
ethyl-3 ethyl-6 nonyne ol-3;
methyl-3 pentadecyne-1 ol-3.

These alpha-acetylenic alcohols are commercial products.
Such a regulator is present at a maximum of 2,000 ppm, preferably in an amount of from 20 to 50 ppm based on the total weight of organopolysiloxanes A, CE, and XL.

Examples of crosslinking retardants F2 that may be used as the cure rate modifier F include so-called inhibitors for controlling the crosslinking reaction and extending the pot life of the silicone composition. Examples of advantageous crosslinking retardants F2 that may be used as the cure rate modifier F include, for example, vinylsiloxanes, 1,3-divinyltetra-methyldi siloxane, or tetravinyl-tetramethyl-tetra-cyclosiloxanes. It is also possible to use other known inhibitors, for example ethynylcyclohexanol, 3-methylbutynol, or dimethyl maleate.

The curable liquid silicone rubber compositions of the invention may also contain one or more of the following optional components, at least one thickener G1 or at least one rheology modifier G2, and/or at least one additive H normally used in the field of the invention.

Rheology modifiers G2 can improve rheological properties, to provide higher flow and smooth surfaces of the shaped articles. Such rheology modifiers G2 can be FIFE-powders, boron oxide derivatives, flow additives like fatty acid fatty alcohol derivatives or derivative, esters and its sans or fluoroalkyl surfactants.

Examples of additives H that may be used include organic dyes or pigments, stabilizers introduced in silicone rubbers in order to improve heat stability, resistance against hot air, reversion, depolymerisation under attack of traces of acids or water at high temperature. Plasticizers, or release oils, or hydrophobicizing oils, such as polydimethylsiloxane oils, without reactive alkenyl or SiH groups. Mold-release such as fatty acid derivatives or fatty alcohol derivatives, fluoroalkyl. Compatibilizer such as hydroxylated silicone oils. Adhesion promoters and adhesion modifiers such organic silanes.

Upon mixing the first liquid composition and the second liquid composition of the two-part system, the curable liquid silicone rubber compositions may be cured at any suitable temperature by any suitable method. For example, the first liquid composition and the second liquid composition of the two-part system may be cured at room temperature (approximately 20-25° C.) or at higher temperatures. In some embodiments, the first liquid composition and the second liquid composition of the two-part system may be cured at 50° C. or higher, at 80° C. or higher, at 100° C. or higher, at 120° C. or higher, at 150° C. or higher. In some embodiments, the first liquid composition and the second liquid composition are cured at room temperature upon mixing.

The curing reaction between the first liquid composition and the second liquid composition may proceed for any length of time necessary to obtain a suitable cured silicone elastomer according to the invention. One of skill in the art will immediately appreciate that the length of the reaction may vary depending on the temperature of the reaction among other variables. In some embodiments, the first liquid composition and the second liquid composition are cured for about one day at room temperature. In other embodiments, the first liquid composition and the second liquid composition are cured for about ten minutes at 100° C.

Upon curing, the silicone rubber composition of the invention has the following composition:

(A) at least one alkenyl group-containing organopolysiloxane A having two silicon-bonded alkenyl groups per molecule, (B) at least one diorganohydrogensiloxy-terminated polydiorganosiloxane chain extender CE, (C) at least one organosilicon crosslinker XL containing at least 3 silicon-bonded hydrogen atoms per molecule, (D) at least one addition reaction catalyst D, (E) at least one filler E, (F) optionally, at least one cure rate modifier F, (G) optionally, at least one thickener G1 or at least one rheology modifier G2, and (H) optionally at least one additive H, in which the amounts of A, CE, and XL in the cured silicone elastomers are preferably selected to result in: 1) the molar ratio of hydrogen atoms to alkenyl groups within the silicon elastomer (RHalk) of between 1.00 and 1.35; and 2) the percentage of hydrogen atoms directly bonded to a silicon atom in CE out the number of moles of hydrogen atoms directly bonded to a silicon atom in both CE and XL combined (RHCE) of between 50 and 98%.

The cured silicone elastomers of the invention exhibit an elongation-at-break value of at least 800% as measured by any standard test known in the art, such as ASTM D-412. Alternatively, the cured silicone elastomers of the invention exhibit an elongation-at-break value of at least 1000%, at least 1100%, at least 1200%, at least 1300%, at least 1400%, at least 1500%, at least 1600%, at least 1700%, at least 1800%, at least 1900%, or at least 2000%.

In some embodiments, the cured silicone elastomers of the invention exhibit an elongation-at-break value of up to 5000%. Alternatively, the cured silicone elastomers of the invention exhibit an elongation-at break value of up to 4000%, up to 3000%, up to 2500%, or up to 2000%.

In some embodiments, the cured silicone elastomers of the invention exhibit an elongation-at-break value of from 800% to 5000%. Alternatively, the cured silicone elastomers of the invention exhibit an elongation-at-break value of from 800% to 1200%, from 800% to 1400%, from 800% to 1500%, from 800% to 1600%, from 800% to 2000%, from 800% to 2500%, or from 800% to 3000%. In other embodiments, the cured silicone elastomers of the invention exhibit an elongation-at-break value of from 1000% to 1400%, from 1000% to 1500%, from 1000% to 1600%, from 1000% to 1700%, from 1000% to 1800%, from 1000% to 2000%, from 1000% to 2500%, from 1000% to 3000%, from 1000% to 4000%, or from 1000% to 5000%. In other embodiments, the cured silicone elastomers of the invention exhibit an elongation-at-break value of from 1100% to 1400%, from 1100% to 1500%, from 1100% to 1600%, from 1100% to 1700%, from 1100% to 1800%, from 1100% to 2000%, from 1100% to 2500%, from 1100% to 3000%, from 1100% to 4000%, or from 1100% to 5000%. In other embodiments, the cured silicone elastomers of the invention exhibit an elongation-at-break value of from 1200% to 1400%, from 1200% to 1500%, from 1200% to 1600%, from 1200% to 1700%, from 1200% to 1800%, from 1200% to 2000%, from 1200% to 2500%, from 1200% to 3000%, from 1200% to 4000%, or from 1200% to 5000%. In other embodiments, the cured silicone elastomers of the invention exhibit an elongation-at-break value of from 1300% to 1400%, from 1300% to 1500%, from 1300 to 1600%, from 1300% to 1700%, from 1300% to 1800%, from 1300% to 2000%, from 1300% to 2500%, from 1300% to 3000%, from 1300% to 4000%, or from 1300% to 5000%. In other embodiments, the cured silicone elastomers of the invention exhibit an elongation-at-break value of from 1400% to 1500%, from 1400% to 1600%, from 1400% to 1700%, from 1400% to 1800%, from 1400% to 2000%, from 1400% to 2500%, from 1400% to 3000%, from 1400% to 4000%, or from 1400% to 5000%. In other embodiments, the cured silicone elastomers of the invention exhibit an elongation-at-break value of from 1500% to 2000%, from 1500% to 2500%, from 1500% to 3000%, from 1500% to 4000%, or from 1500% to 5000%. In other embodiments, the cured silicone elastomers of the invention exhibit an elongation-at-break value of from 1700% to 2000%, from 1700% to 2500%, from 1700% to 3000%, from 1700% to 4000%, or from 1700% to 5000%. In other embodiments, the cured silicone elastomers of the invention exhibit an elongation-at-break value of from 1800% to 2000%, from 1800% to 2500%, from 1800% to 3000%, from 1800% to 4000%, or from 1800% to 5000%. In other embodiments, the cured silicone elastomers of the invention exhibit an elongation-at-break value of from 2000% to 2500%, from 2000% to 3000%, from 2000% to 4000%, or from 2000% to 5000%. In other embodiments, the cured silicone elastomers of the invention exhibit an elongation-at-break value of from 2500% to 3000%, from 2500% to 4000%, or from 2500% to 5000%.

In some embodiments, the cured silicone elastomers of the invention exhibit a tensile strength of at least about 60 psi (0.41 MPa), preferably of at least 90 psi (0.62 MPa), at least about 100 psi (0.69 MPa), at least about 125 psi (0.86 MPa), at least about 150 psi (1.03 MPa), at least about 175 psi (1.29 MPa), at least about 200 psi (1.37 MPa), at least about 250 psi (1.72 MPa), at least about 300 psi (2.06 MPa), at least about 350 psi (2.41 MPa), at least about 400 psi (2.75 MPa), at least about 450 psi (3.10 MPa), at least about 500 psi (3.44 MPa), or at least about 550 psi (3.79 MPa).

For example, the cured silicone elastomers of the invention may exhibit a tensile strength of from about 60 (0.41 MPa) to about 1300 psi (8.96 MPa), from about 60 (0.41 MPa) to about 1200 psi (8.27 MPa), from about 60 (0.41 MPa) to about 1100 psi (7.58 MPa), from about 60 (0.41 MPa) to about 1000 psi (6.89 MPa), from about 60 (0.41 MPa) to about 900 psi (6.21 MPa), from about 60 (0.41 MPa) to about 800 psi (5.52 MPa), from about 60 (0.41 MPa) to about 700 psi (4.83 MPa), from about 60 (0.41 MPa) to about 600 psi (4.13 MPa), from about 60 (0.41 MPa) to about 550 psi (3.79 MPa), from about 60 (0.41 MPa) to about 500 psi (3.44 MPa), from about 60 (0.41 MPa) to about 450 psi (3.10 MPa), from about 60 (0.41 MPa) to about 400 psi (2.75 MPa), from about 60 (0.41 MPa) to about 350 psi (2.41 MPa), from about 60 (0.41 MPa) to about 300 psi (2.06 MPa), from about 60 (0.41 MPa) to about 250 psi (1.72 MPa), from about 60 (0.41 MPa) to about 200 psi (1.37 MPa), from about 60 psi (0.41 MPa) to about 150 psi (1.03 MPa). Alternatively, the cured silicone elastomers of the invention may exhibit a tensile strength of from about 90 (0.62 MPa) to about 1300 psi (8.96 MPa), from about 90 (0.62 MPa) to about 1200 psi (8.27 MPa), from about 90 (0.62 MPa) to about 1100 psi (7.58 MPa), from about 90 (0.62 MPa) to about 1000 psi (6.89 MPa), from about 90 (0.62 MPa) to about 900 psi (6.21 MPa), from about 90 (0.62 MPa) to about 800 psi (5.52 MPa), from about 90 (0.62 MPa) to about 700 psi (4.83 MPa), from about 90 (0.62 MPa) to about 600 psi (4.13 MPa), from about 90 (0.62 MPa) to about 550 psi (3.79 MPa), from about 90 (0.62 MPa) to about 500 psi (3.44 MPa), from about 90 (0.62 MPa) to about 450 psi (3.10 MPa), from about 90 (0.62 MPa) to about 400 psi (2.75 MPa), from about 90 (0.62 MPa) to about 350 psi (2.41 MPa), from about 90 (0.62 MPa) to about 300 psi (2.06 MPa), from about 90 (0.62 MPa) to about 250 psi (1.72 MPa), from about 90 (0.62 MPa) to about 200 psi (1.37 MPa), from about 90 (0.62 MPa) to about 150 psi (1.03 MPa). In another embodiment, the cured silicone elastomers of the invention may exhibit a tensile strength of from about 100 (0.69 MPa) to about 1300 psi (8.96 MPa), from about 100 (0.69 MPa) to about 1200 psi (8.27 MPa), from about 100 (0.69 MPa) to about 1100 psi (7.58 MPa), from about 100 (0.69 MPa) to about 1000 psi (6.89 MPa), from about 100 (0.69 MPa) to about 900 psi (6.21 MPa), from about 100 (0.69 MPa) to about 800 psi (5.52 MPa), from about 100 (0.69 MPa) to about 700 psi (4.83 MPa), from about 100 (0.69 MPa) to about 600 psi (4.13 MPa), from about 100 (0.69 MPa) to about 550 psi (3.79 MPa), from about 100 (0.69 MPa) to about 500 psi (3.44 MPa), from about 100 (0.69 MPa) to about 450 psi (3.10 MPa), from about 100 (0.69 MPa) to about 400 psi (2.75 MPa) from about 100 (0.69 MPa) to about 350 psi (2.41 MPa), from about 100 (0.69 MPa) to about 300 psi (2.06 MPa). In another embodiment, the cured silicone elastomers of the invention may exhibit a tensile strength of from about 150 (1.03 MPa) to about 1300 psi (8.96 MPa), from about 150 (1.03 MPa) to about 1200 psi (8.27 MPa), from about 150 (1.03 MPa) to about 1100 psi (7.58 MPa), from about 150 (1.03 MPa) to about 1000 psi (6.89 MPa), from about 150 (1.03 MPa) to about 900 psi (6.21 MPa), from about 150 (1.03 MPa) to about 800 psi (5.52 MPa), from about 150 (1.03 MPa) to about 700 psi (4.83 MPa), from about 150 (1.03 MPa) to about 600 psi (4.13 MPa), from about 200 (1.37 MPa) to about 600 psi (4.13 MPa), from about 250 psi (1.72 MPa) to about 600 psi (4.13 MPa), from about 300 psi (2.06 MPa) to about 600 psi (4.13 MPa), from about 350 psi (2.41 MPa) to about 600 psi (4.13 MPa), from about 400 psi (2.75 MPa) to about 600 psi (4.13 MPa), from about 450 psi (3.10 MPa) to about 600 psi (4.13 MPa), from about 500 psi (3.44 MPa) to about 600 psi (4.13 MPA), from about 550 psi (3.79 MPa) to about 600 psi (4.13 MPa). In another embodiment, the cured silicone elastomers of the invention exhibit a tensile strength of from 90 (0.62 MPa) to about 100 psi (0.69 MPa), from 90 (0.62 MPa) to about 150 psi (1.03 MPa), from 100 (0.69 MPa) to about 150 psi (1.03 MPa), from about 150 psi (1.03 MPa) to about 200 psi (1.37 MPa), from about 200 psi (1.37 MPa) to about 250 psi (1.72 MPa), from about 250 psi (1.72 MPa) to about 300 psi (2.06 MPa), from about 300 psi (2.06 MPa) to about 350 psi (2.41 MPa), from about 350 psi (2.41 MPa) to about 400 psi (2.75 MPa), from about 400 psi (2.75 MPa) to about 450 psi (3.10 MPa), from about 450 psi (3.10 MPa) to about 500 psi (3.44 MPa), from about 500 psi (3.44 MPa) to about 550 psi (3.79 MPa), or from about 550 psi (3.79 MPa to about 600 psi (4.13 MPa).

In some embodiments, the cured silicone elastomers of the invention return to within 120% of their original length after stretching, preferably within 115% of their original length, preferably within 110% of their original length, and preferably within 105% of their original length after stretching. For example, in some embodiments, the cured silicone elastomers of the invention return to within 120% of their original length after stretching, preferably within 115% of their original length, preferably within 110% of their original length, and preferably within 105% of their original length within 15 minutes after stretching. In some embodiments, the cured silicone elastomers of the invention return to within 120% of their original length after stretching, preferably within 115% of their original length, preferably within 110% of their original length, and preferably within 105% of their original length within 5 minutes after stretching. In some embodiments, the cured silicone elastomers of the invention return to within 120% of their original length after stretching, preferably within 115% of their original length, preferably within 110% of their original length, and preferably within 105% of their original length immediately after stretching.

The cured silicone elastomers of the invention may be used in a variety of applications, such as electrical equipment, vehicles, construction, medical care and foods. For example, a cured product comprising the silicone elastomer composition according to the present invention can be used in rubber contacts for remote controllers, typewriters, word processors, computer terminals, musical instruments and the like; gaskets for construction; rollers such as copier rollers, developing rollers, transfer rollers, charging rollers and paper feed rollers; rubber vibration insulators for motorcycles and the like; water distribution components such as valves, hoses, tubes, packing, seals and joints; children's toys, tableware, cookware (including silicone steamers), toothbrushes, teats for baby bottles, infants' pacifiers, artificial teats, sporting goods, underwater eyeglasses for diving, goggles for diving, vehicle components, scale models and artificial skin components for robots.

In particular, a cured product comprising the silicone elastomers of the invention exhibits excellent elongation and durability and exhibits appropriate hardness and other physical properties to be used in elastic medical materials and/or devices. Indeed, the physical properties of such cured silicone materials make them potentially suitable for applications requiring not only flexibility and strength, but also the ability to be formed into intricate shapes and survive high temperatures and sterilization without deforming. For example, a cured product comprising the silicone elastomers of the invention is suitable for use in a variety of medical tubes, stomach catheters, medical balloons, catheter balloons, artificial dialysis machines, blood dialysis machines, implant components, chemical stoppers, O-rings, tubing in peristaltic drug delivery pumps, check valves, resuscitator bulbs, and diaphragm and prosthesis suction cups for limb attachment.

The cured silicone elastomers of the invention can also be used in wearable devices, flexible displays, and devices for monitoring physiological signals. Stretchable electronics and optoelectronics offering elastic responses to large strain deformations comprising the silicone elastomers of the invention are also provided, such as, for example, artificial electronic skins (e-skin), epidermal/biomedical devices (microfluidic), biometric lenses, electronic eye, wearable photovoltaic, smart clothing, medical diagnostics, sportswear, bendable displays, soft surgical tools and body sensor networks. The cured silicone elastomers of the invention are particularly well-suited for electronics and sensor systems that are small, lightweight, mechanically flexible and low-power. These systems must also be able to conform to the shape of and survive the environment in which they must operate.

Use of the cured silicone elastomers of the invention in an article and/or product, such as a medical device or electronic device described herein is also provided.

Also provided is a method of making the cured silicone elastomers of the invention in which the two part curable liquid silicone rubber composition comprising a first liquid composition comprising components (A), (B), (C), (E), and (F), but not (D) and a second liquid composition comprising components (A), (E), and (D), but not (B) and not (C) and not (F) are mixed and cured to yield the cured silicone elastomer.

The two part curable liquid silicone rubber composition may alternatively be processed (or cured) using a 3D printing method. A typical method of forming a three-dimensional (3D) article comprises the following steps:

i) printing a first heat-curable silicone composition with a 3D printer to form a layer;
ii) heating the layer to form an at least partially cured layer;
iii) printing a second heat-curable silicone composition on the at least partially cured layer with the 3D printer to form a subsequent layer;
iv) heating the subsequent layer to form an at least partially cured subsequent layer; and
v) optionally, repeating steps iii) and iv) with independently selected heat-curable silicone composition(s) for any additional layer(s) to form the 3D article;
wherein the first and second heat-curable silicone compositions are the same as or different from one another, and wherein at least one of the first and second heat-curable silicone compositions is the curable liquid silicone rubber composition X according to the invention and as described above.

Other advantages provided by the present invention will become apparent from the following illustrative examples.

EXAMPLES

Materials and Methods
Preparation of the Silicone Compositions
In the Examples below, the following components were used:

A1: linear α,ω-vinyl polydimethylsiloxanes (average viscosity of 3500 mPa·s; Mn≈27,000 g/mol)

A2: linear α,ω-vinyl polydimethylsiloxanes (average viscosity of 20000 mPa·s; Mn≈49,000 g/mol)

B: α,ω-hydride polydimethylsiloxanes (H-PDMS-H) (viscosity of 7-10 mPa·s; Mn≈750 g/mol)

C: copolymer of dimethylsiloxane and methylhydrogensiloxane capped at both molecular terminals with dimethyl groups (viscosity of 6-12 mPa·s; 9.5-11.0% SiH by weight (XL1)

OR copolymer of dimethylsiloxane and methylhydrogensiloxane partially capped at both molecular terminals with di-methylhydrogensiloxy groups (viscosity of 28-32 mPa·s; 6.4-8.2% SiH by weight (XL2)

D: platinum catalyst solution: platinum metal diluted in short linear α,ω-vinyl polydimethylsiloxane oils (weight % in platinum=10)

E: In situ treated hydrophilic fumed silica (AEROSIL® 300 treated with hexamethyldisilazane)

F: ECH (1-Ethynyl-1-cyclohexanol)

First Liquid Composition (for 100a Batch)
1. Add appropriate amount of LSR Base to the container.
2. Add an appropriate amount of vinyl polymer to the container to obtain mixture of components A and E.
3. Add an appropriate amount of component B to the container.
4. Speed mix components for 20 seconds @ 2000 rpm.
5. Add an appropriate amount of ECH (F) to the container.
6. Add an appropriate amount of crosslinker (C) to the container.
7. Speed mix components for 20 seconds @ 2000 rpm.
8. Hand mix for 15 seconds.
9. Speed mix formulation for 20 seconds @ 2000 rpm. Final product should appear as a homogeneous mixture.
10. Allow product to cool for at least 30 minutes before testing.

Second Liquid Composition (for 100 g Batch)
1. Add appropriate amount of LSR Base to the container.
2. Add an appropriate amount of vinyl polymer to the container.
3. Speed mix the components for 20 seconds @ 2000 rpm to obtain mixture of components A and E.
4 Add an appropriate amount of 10% platinum catalyst solution (D).
5. Speed mix formulation for 20 seconds @ 2000 rpm.
6. Hand mix the material for 15 seconds.
7. Speed mix formulation for 20 seconds @ 2000 rpm. Final product should appear as a homogeneous mixture.
8. Allow material to cool for at least 30 minutes before testing.

To obtain the silicone elastomer Z, the first liquid composition and the second liquid composition described above were mixed and cured for 1 day at room temperature, or alternatively for 10 minutes at 100° C.

Example A—Production of Silicone Elastomers with High Elongation-at-Break Values In the below examples, the amounts of components A, B, C, and E were varied and upon mixing the first and second liquid compositions (Parts #1 & 2) and curing for 1 day at room temperature, the resulting cured silicone elastomers Z were tested using the standard ASTM D-412. Two separate crosslinkers (component (C) were tested; in Tables 1 & 2, XL1 was used and in Table 3 & 4, XL2 was used.

TABLE 1

| Examples | Comp. 1 | Ex. 2 | Ex. 3 | Ex. 4 | Ex. 5 | Ex. 6 | Comp. 7 |
|---|---|---|---|---|---|---|---|
| α | 0.267 | 0.267 | 0.267 | 0.267 | 0.267 | 0.267 | 0.267 |
| RHalk | 1.00 | 1.10 | 1.15 | 1.20 | 1.25 | 1.30 | 1.35 |
| RHCE | 90 | 90 | 90 | 90 | 90 | 90 | 90 |
| Part #1 (in part) | | | | | | | |
| A1 | 55.61 | 55.55 | 55.49 | 55.45 | 55.41 | 55.36 | 55.27 |
| A2 | 18 | 17.86 | 17.76 | 17.68 | 17.58 | 17.49 | 17.34 |
| B | 3.42 | 3.68 | 3.85 | 4.00 | 4.17 | 4.33 | 4.58 |
| C | 0.193 | 0.2170 | 0.2250 | 0.2370 | 0.2450 | 0.2550 | 0.261 |
| E | 22.99 | 22.96 | 22.94 | 22.92 | 22.91 | 22.89 | 22.85 |
| F | 0.034 | 0.034 | 0.034 | 0.034 | 0.034 | 0.034 | 0.034 |
| Part #2 (in part) | | | | | | | |
| A1 | 55.61 | 55.55 | 55.49 | 55.45 | 55.41 | 55.36 | 55.27 |
| A2 | 21.46 | 21.49 | 17.76 | 21.71 | 21.79 | 21.86 | 21.95 |
| D | 0.039 | 0.039 | 0.039 | 0.039 | 0.039 | 0.039 | 0.039 |
| E | 22.99 | 22.96 | 22.94 | 22.92 | 22.91 | 22.89 | 22.85 |
| Mechanical properties: Mix part #1 + part #2-Curing at RT for 1 day-ASTM D-412 | | | | | | | |
| Elongation-at-Break (%) | Gel like material | 1506 | 1445 | 1400 | 1455 | 1593 | Gel like material |
| Tensile Strength (MPa) | Gel like material | 0.38 | 1.21 | 1.38 | 0.73 | 0.55 | Gel like material |

TABLE 2

| Examples | Ex. 8 | Ex. 4 | Ex. 9 | Ex. 10 | Ex. 11 | Ex. 12 | Ex. 13 | Ex. 14 | Ex. 15 |
|---|---|---|---|---|---|---|---|---|---|
| α | 0.267 | 0.267 | 0.267 | 0.267 | 0.267 | 0.267 | 0.267 | 0.267 | 0.267 |
| RHalk | 1.20 | 1.20 | 1.20 | 1.20 | 1.20 | 1.20 | 1.20 | 1.20 | 1.20 |
| RHCE | 94 | 90 | 84 | 80 | 78 | 76 | 68 | 64 | 56 |
| Part #1 (in part) | | | | | | | | | |
| A1 | 55.37 | 55.45 | 55.51 | 55.56 | 55.59 | 55.61 | 55.71 | 55.75 | 55.86 |
| A2 | 17.45 | 17.68 | 17.89 | 18.04 | 18.12 | 18.19 | 18.47 | 18.60 | 18.94 |
| B | 4.23 | 4.00 | 3.78 | 3.61 | 3.5 | 3.43 | 3.10 | 2.95 | 2.55 |
| C | 0.14 | 0.237 | 0.390 | 0.48 | 0.52 | 0.58 | 0.74 | 0.82 | 1.02 |
| E | 22.89 | 22.92 | 22.95 | 22.97 | 22.98 | 22.99 | 23.03 | 23.05 | 23.09 |
| F | 0.034 | 0.034 | 0.034 | 0.034 | 0.034 | 0.034 | 0.034 | 0.034 | 0.034 |
| Part #2 (in part) | | | | | | | | | |
| A1 | 55.37 | 55.45 | 55.51 | 55.56 | 55.59 | 55.61 | 55.71 | 55.75 | 55.86 |
| A2 | 21.75 | 21.71 | 21.70 | 21.68 | 21.66 | 21.66 | 21.61 | 21.59 | 21.53 |
| D | 0.039 | 0.039 | 0.039 | 0.039 | 0.039 | 0.039 | 0.039 | 0.039 | 0.039 |
| E | 22.89 | 22.92 | 22.95 | 22.97 | 22.98 | 22.99 | 23.03 | 23.05 | 23.09 |
| Mechanical properties: Mix part #1 + part #2-Curing at RT for 1 day-ASTM D-412 | | | | | | | | | |
| Elongation-at-Break (%) | 1586 | 1460 | 1439 | 1365 | 1310 | 1286 | 1282 | 1238 | 1138 |
| Tensile Strength (MPa) | 0.47 | 1.38 | 2.32 | 3.41 | 4.42 | 5.1 | 7.79 | 8.03 | 7.84 |

TABLE 3

| Examples | Comp. 16 | Ex. 17 | Ex. 18 | Ex. 19 | Ex. 20 | Ex. 21 |
|---|---|---|---|---|---|---|
| α | 0.181 | 0.181 | 0.181 | 0.181 | 0.181 | 0.181 |
| RHalk | 1.00 | 1.05 | 1.10 | 1.15 | 1.175 | 1.20 |
| RHCE | 90 | 90 | 90 | 90 | 90 | 90 |
| Part #1 (in part) | | | | | | |
| A1 | 55.63 | 55.58 | 55.53 | 55.48 | 55.46 | 55.43 |
| A2 | 18.06 | 17.96 | 17.68 | 17.76 | 17.72 | 17.68 |
| B | 3.42 | 3.60 | 4.1 | 3.95 | 4.02 | 4.1 |
| C | 0.305 | 0.315 | 0.355 | 0.340 | 0.350 | 0.355 |
| E | 22.99 | 22.97 | 22.96 | 22.93 | 22.93 | 22.92 |
| F | 0.034 | 0.034 | 0.034 | 0.034 | 0.034 | 0.034 |

TABLE 3-continued

| Examples | Comp. 16 | Ex. 17 | Ex. 18 | Ex. 19 | Ex. 20 | Ex. 21 |
|---|---|---|---|---|---|---|
| Part #2 (in part) | | | | | | |
| A1 | 55.63 | 55.58 | 55.53 | 55.48 | 55.46 | 55.43 |
| A2 | 21.52 | 21.59 | 21.66 | 21.74 | 21.78 | 21.81 |
| D | 0.039 | 0.039 | 0.039 | 0.039 | 0.039 | 0.039 |
| E | 22.99 | 22.97 | 22.96 | 22.93 | 22.93 | 22.92 |
| Mechanical properties: Mix part #1 + part #2-Curing at RT for 1 day-ASTM D-412 | | | | | | |
| Elongation-at-Break (%) | Gel like material | 1300 | 1100 | 1500 | 1500 | 1500 |
| Tensile Strength (MPa) | Gel like material | 0.49 | 1.00 | 2.17 | 1.72 | 2.06 |

TABLE 4

| Examples | Comp 22 | Ex. 23 | Ex. 24 | Ex. 20 | Ex. 25 | Ex. 26 | Ex. 27 | Ex. 28 | Ex. 29 | Ex. 30 |
|---|---|---|---|---|---|---|---|---|---|---|
| α | 0.181 | 0.181 | 0.181 | 0.181 | 0.181 | 0.181 | 0.181 | 0.181 | 0.181 | 0.181 |
| RHalk | 1.175 | 1.175 | 1.175 | 1.175 | 1.175 | 1.175 | 1.175 | 1.1.75 | 1.175 | 1.175 |
| RHCE | 98 | 96 | 92 | 90 | 88 | 86 | 84 | 80 | 76 | 70 |
| Part #1 (in part) | | | | | | | | | | |
| A1 | 55.33 | 55.38 | 55.43 | 55.46 | 55.48 | 55.50 | 55.53 | 55.56 | 55.62 | 55.69 |
| A2 | 17.31 | 22.89 | 17.64 | 17.72 | 17.81 | 17.89 | 17.98 | 18.12 | 18.32 | 18.61 |
| B | 4.45 | 4.29 | 4.08 | 4.02 | 3.94 | 3.86 | 3.76 | 3.64 | 3.44 | 3.17 |
| C | 0.04 | 0.14 | 0.30 | 0.35 | 0.42 | 0.49 | 0.56 | 0.695 | 0.85 | 1.05 |
| E | 22.88 | 22.89 | 22.92 | 22.93 | 22.94 | 22.95 | 22.96 | 22.97 | 22.99 | 23.02 |
| F | 0.034 | 0.034 | 0.034 | 0.034 | 0.034 | 0.034 | 0.034 | 0.034 | 0.034 | 0.034 |
| Part #2 (in part) | | | | | | | | | | |
| A1 | 55.33 | 55.38 | 55.43 | 55.46 | 55.48 | 55.50 | 55.53 | 55.56 | 55.62 | 55.69 |
| A2 | 21.80 | 21.78 | 21.78 | 21.78 | 21.78 | 21.78 | 21.78 | 21.80 | 21.79 | 21.78 |
| D | 0.039 | 0.039 | 0.039 | 0.039 | 0.039 | 0.039 | 0.039 | 0.039 | 0.039 | 0.039 |
| E | 22.88 | 22.89 | 22.92 | 22.93 | 22.94 | 22.95 | 22.96 | 22.97 | 22.99 | 23.02 |
| Mechanical properties: Mix part #1 + part #2-Curing at RT for 1 day-ASTM D-412 | | | | | | | | | | |
| Elongation-at-Break (%) | Gel like material | 1500 | 1500 | 1500 | 1500 | 1500 | 1500 | 1400 | 1400 | 1200 |
| Tensile Strength (MPa) | Gel like material | 0.42 | 1.24 | 1.72 | 2.20 | 2.31 | 3.48 | 3.51 | 5.92 | 7.34 |

As illustrated in the above tables, after curing for one day at room temperature, silicone elastomers Z with an RHalk value of 1.00 or 1.35 were gel-like and thus, elongation-at-break and tensile strength could not be measured. However, silicone elastomers Z with an RHalk value greater than 1.00 and less than 1.35 demonstrated high levels of stretchability as indicated by elongation-at-break values of greater than 1100%.

Silicone elastomers Z with an RHCE value of 98% were also gel-like. However, silicone elastomers Z with an RHCE value of less than 98% demonstrated high levels of stretchability. It is noted that stretchability tends to decrease with decreasing RHCE values (i.e., increasing amounts of crosslinker). However, silicone elastomers Z using crosslinker XL2 were highly stretchable with RHCE values of 70% or greater and silicone elastomers Z using crosslinker XL1 were highly stretchable with RHCE values of 50% or greater.

Example B—Production of Silicone Elastomers with High Elongation-at-Break Values and High Durability To measure the durability of the cured silicone elastomers Z of the invention tested in EXAMPLE A, two additional mechanical properties were measured.

First, it was determined if each cured silicone elastomer withstood elongation without breaking (i.e., the elastomer can be stretched more than once). The data for silicone elastomers Z produced using crosslinker XL1 is presented in Table 5. The data for silicone elastomers Z produced using crosslinker XL2 is presented in Table 6.

TABLE 5

| Examples | Ex. 2 | Ex. 3 | Ex. 4 | Ex. 6 | Ex. 8 | Ex. 9 | Ex. 10 | Ex. 11 | Ex. 12 | Ex. 13 |
|---|---|---|---|---|---|---|---|---|---|---|
| α | 0.267 | 0.267 | 0.267 | 0.267 | 0.267 | 0.267 | 0.267 | 0.267 | 0.267 | 0.267 |
| RHalk | 1.10 | 1.15 | 1.20 | 1.30 | 1.20 | 1.20 | 1.20 | 1.20 | 1.20 | 1.20 |
| RHCE | 90 | 90 | 90 | 90 | 94 | 84 | 80 | 78 | 76 | 68 |

TABLE 5-continued

| Examples | Ex. 2 | Ex. 3 | Ex. 4 | Ex. 6 | Ex. 8 | Ex. 9 | Ex. 10 | Ex. 11 | Ex. 12 | Ex. 13 |
|---|---|---|---|---|---|---|---|---|---|---|
| Part #1 (in part) | | | | | | | | | | |
| A1 | 55.55 | 55.49 | 55.45 | 55.36 | 55.37 | 55.51 | 55.56 | 55.59 | 55.61 | 55.71 |
| A2 | 17.86 | 17.76 | 17.68 | 17.49 | 17.45 | 17.89 | 18.04 | 18.12 | 18.19 | 18.47 |
| B | 3.68 | 3.85 | 4.00 | 4.33 | 4.23 | 3.78 | 3.61 | 3.5 | 3.43 | 3.10 |
| C | 0.2170 | 0.2250 | 0.2370 | 0.2550 | 0.14 | 0.390 | 0.48 | 0.52 | 0.58 | 0.74 |
| E | 22.96 | 22.94 | 22.92 | 22.89 | 22.89 | 22.95 | 22.97 | 22.98 | 22.99 | 23.03 |
| F | 0.034 | 0.034 | 0.034 | 0.034 | 0.034 | 0.034 | 0.034 | 0.034 | 0.034 | 0.034 |
| Part #2 (in part) | | | | | | | | | | |
| A1 | 55.55 | 55.49 | 55.45 | 55.36 | 55.37 | 55.51 | 55.56 | 55.59 | 55.61 | 55.71 |
| A2 | 21.49 | 17.76 | 21.71 | 21.86 | 21.75 | 21.70 | 21.68 | 21.66 | 21.66 | 21.61 |
| D | 0.039 | 0.039 | 0.039 | 0.039 | 0.039 | 0.039 | 0.039 | 0.039 | 0.039 | 0.039 |
| E | 22.96 | 22.94 | 22.92 | 22.89 | 22.89 | 22.95 | 22.97 | 22.98 | 22.99 | 23.03 |
| Mechanical properties: Mix part #1 + part #2-Curing at RT for 1 day-ASTM D-412 | | | | | | | | | | |
| Elongation-at-Break (%) | 1506 | 1445 | 1400 | 1593 | 1586 | 1439 | 1365 | 1310 | 1286 | 1282 |
| Tensile Strength (MPa) | 0.38 | 1.21 | 1.38 | 0.55 | 0.47 | 2.32 | 3.41 | 4.42 | 5.1 | 7.79 |
| Sample withstands elongation without breaking | Yes | Yes | Yes | Yes | Yes | Yes | Yes | Yes | No | No |

TABLE 6

| Examples | Ex. 17 | Ex. 18 | Ex. 20 | Ex. 21 | Ex. 23 | Ex. 25 | Ex. 26 | Ex. 27 | Ex. 28 |
|---|---|---|---|---|---|---|---|---|---|
| α | 0.181 | 0.181 | 0.181 | 0.181 | 0.181 | 0.181 | 0.181 | 0.181 | 0.181 |
| RHalk | 1.05 | 1.10 | 1.175 | 1.20 | 1.175 | 1.175 | 1.175 | 1.175 | 1.1.75 |
| RHCE | 90 | 90 | 90 | 90 | 96 | 88 | 86 | 84 | 80 |
| Part #1 (in part) | | | | | | | | | |
| A1 | 55.58 | 55.53 | 55.46 | 55.43 | 55.38 | 55.48 | 55.50 | 55.53 | 55.56 |
| A2 | 17.96 | 17.68 | 17.72 | 17.68 | 22.89 | 17.81 | 17.89 | 17.98 | 18.12 |
| B | 3.60 | 4.1 | 4.02 | 4.1 | 4.29 | 3.94 | 3.86 | 3.76 | 3.64 |
| C | 0.315 | 0.355 | 0.350 | 0.355 | 0.14 | 0.42 | 0.49 | 0.56 | 0.695 |
| E | 22.97 | 22.96 | 22.93 | 22.92 | 22.89 | 22.94 | 22.95 | 22.96 | 22.97 |
| F | 0.034 | 0.034 | 0.034 | 0.034 | 0.034 | 0.034 | 0.034 | 0.034 | 0.034 |
| Part #2 (in part) | | | | | | | | | |
| A1 | 55.58 | 55.53 | 55.46 | 55.43 | 55.38 | 55.48 | 55.50 | 55.53 | 55.56 |
| A2 | 21.59 | 21.66 | 21.78 | 21.81 | 21.78 | 21.78 | 21.78 | 21.78 | 21.80 |
| D | 0.039 | 0.039 | 0.039 | 0.039 | 0.039 | 0.039 | 0.039 | 0.039 | 0.039 |
| E | 22.97 | 22.96 | 22.93 | 22.92 | 22.89 | 22.94 | 22.95 | 22.96 | 22.97 |
| Mechanical properties: Mix part #1 + part #2-Curing at RT for 1 day-ASTM D-412 | | | | | | | | | |
| Elongation-at-Break (%) | 1300 | 1100 | 1500 | 1500 | 1500 | 1500 | 1500 | 1500 | 1400 |
| Tensile Strength (MPa) | 0.49 | 1.00 | 1.72 | 2.06 | 0.42 | 2.20 | 2.31 | 3.48 | 3.51 |
| Sample withstands elongation without breaking | Yes | Yes | Yes | Yes | Yes | Yes | Yes | No | No |

As demonstrated in Tables 5 & 6, the silicone elastomers Z of the invention are highly durable. When crosslinker XL1 is used (Table 5), which has an a value of 0.267, elastomers Z with an RHCE value greater than 76% withstood elongation without breaking. When crosslinker XL2 is used (Table 6), which has an a value of 0.181, elastomers Z with an RHCE value greater than 84% withstood elongation without breaking.

It was also demonstrated that silicone elastomers Z with an RHalk value greater than 1.05 but less than 1.25 withstood elongation without breaking regardless of which crosslinker was used (XL1 or XL2). However, using crosslinker XL1, silicone elastomers Z with an RHalk value greater than 1.05 but less than 1.35 withstood elongation without breaking.

Second, the length of some of the elastomers Z produced using crosslinker XL1 were measured before and after stretching and percent recovery to the original length was calculated. The initial length of each of the tested elastomers Z was 7.6 cm. Each of the tested elastomers Z were stretched once to 1000% of their original length (76 cm) and then the length of each elastomer Z was measured immediately after stretching (0 minutes), at 5 minutes after stretching, and again at 15 minutes after stretching. The data are presented below in Table 7.

TABLE 7

| Examples | Ex. 31 | Ex. 2 | Ex. 11 | Ex. 12 |
|---|---|---|---|---|
| α | 0.267 | 0.267 | 0.267 | 0.267 |
| RHalk | 1.05 | 1.10 | 1.20 | 1.20 |
| RHCE | 76 | 90 | 78 | 76 |
| Part #1 (in part) | | | | |
| A1 | 55.72 | 55.55 | 55.59 | 55.61 |
| A2 | 18.34 | 17.86 | 18.12 | 18.19 |
| B | 3.03 | 3.68 | 3.5 | 3.43 |
| C | 0.480 | 0.2170 | 0.52 | 0.58 |
| E | 23.03 | 22.96 | 22.98 | 22.99 |
| F | 0.034 | 0.034 | 0.034 | 0.034 |
| Part #2 (in part) | | | | |
| A1 | 55.72 | 55.55 | 55.59 | 55.61 |
| A2 | 21.44 | 21.49 | 21.66 | 21.66 |
| D | 0.039 | 0.039 | 0.039 | 0.039 |
| E | 23.03 | 22.96 | 22.98 | 22.99 |
| Mechanical properties: Mix part #1 + part #2 - Curing at RT for 1 day - ASTM D-412 | | | | |
| Length (cm) | | | | |
| 0 min | 9.0 | 12.0 | 9.0 | 8.2 |
| 5 min | 8.0 | 10.0 | 8.3 | 8.0 |
| 15 min | 7.8 | 8.5 | 8.0 | 7.8 |
| % Elongation after stretch | | | | |
| 0 min | 118% | 158% | 118% | 108% |
| 5 min | 105% | 132% | 109% | 105% |
| 15 min | 103% | 112% | 105% | 102% |

As illustrated above, each of the silicone elastomers Z tested except Ex. 2 returned to within 120% of its original length immediately after stretching to 1000% of its original length. Furthermore, each of the silicone elastomers Z returned to within 115% of its original length within 15 minutes after stretching to 1000% of its original length. Indeed, the silicone elastomers Z in which the RCHE value was less than 90% returned to within 105% of their original length within 15 minutes after stretching to 1000% of their original length.

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It will be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

We claim:

1. A two-part curable liquid silicone rubber composition comprising a first liquid composition comprising components (A), (B), (C), (E), and (F), but not (D) and a second liquid composition comprising components (A), (E), and (D), but not (B) and not (C) and not (F), wherein the first liquid composition and the second liquid composition are stored separately and yield, upon mixing, a curable liquid silicone rubber composition X which, when cured, yields a silicone elastomer Z having an elongation-at-break value of at least 800% measured according to ASTM D-412, said curable liquid silicone rubber composition X comprising components:
   (A) 100 parts by weight of at least one alkenyl group-containing organopolysiloxane A having two silicon-bonded alkenyl groups per molecule,
   (B) at least one diorganohydrogensiloxy-terminated polydiorganosiloxane CE,
   (C) at least one organosilicon crosslinker XL containing at least 3 silicon-bonded hydrogen atoms per molecule,
   (D) at least one addition reaction catalyst D, and
   (E) from 1 to 500 parts by weight of at least one filler E,
   (F) from 0 to 10 parts by weight of at least one cure rate modifier F,
   wherein A can be the same or different in the first and second liquid compositions, and
   wherein E can be the same or different in the first and second liquid compositions,
   wherein the amounts of the alkenyl group-containing organopolysiloxane A, the diorganohydrogensiloxy-terminated polydiorganosiloxane CE, and the organosilicon crosslinker XL are determined such that:
   1) the value of the ratio RHalk is 1.00<RHalk<1.35, wherein RHalk=nH/tAlk, and wherein:
      nH=number of moles of hydrogen atom directly bonded to a silicon atom of said liquid silicone rubber composition X; and
      tAlk=number of moles of alkenyl groups directly bonded to a silicon atom of said liquid silicone rubber composition X, and
   2) the % molar ratio RHCE is within the range of 50%≤RHCE<98%, wherein RHCE=nHCE/(nHCE+nHXL)×100, and wherein:
      a) nHCE is the number of moles of hydrogen atom directly bonded to a silicon atom of the diorganohydrogensiloxy-terminated polydiorganosiloxane CE, and
      b) nHXL=is the number of moles of hydrogen atom directly bonded to a silicon atom of the organosilicon crosslinker XL.

2. The two-part curable liquid silicone rubber composition according to claim 1, wherein said organosilicon crosslinker XL containing at least 3 silicon-bonded hydrogen atoms per molecule is an organohydrogenpolysiloxane comprising from 10 to 500 silicon atoms within each molecule, and wherein ratio α is within the range 0.01≤α≤0.957,
   wherein α=d/(ΣSi), and wherein:
      d=number of H atoms directly linked to a Si atom per molecule, and
      ΣSi is the sum of silicon atoms per molecule.

3. The two-part curable liquid silicone rubber composition according to claim 1, wherein said organosilicon crosslinker XL containing at least 3 silicon-bonded hydrogen atoms per molecule is an organohydrogenpolysiloxane comprising from 10 to 500 silicon atoms within each molecule, and wherein the organohydrogenpolysiloxane comprises from 0.45-40% SiH by weight.

4. The two-part curable liquid silicone rubber composition according to claim 1, wherein said organosilicon crosslinker XL comprises:
(i) at least 3 siloxy units of formula (XL-1) which may be identical or different:

$$(H)(Z)_e SiO_{(3-e)/2} \quad (XL-1)$$

wherein:
the symbol H represents a hydrogen atom,
the symbol Z represents an alkyl having from 1 to 8 carbon atoms inclusive, and
the symbol e is equal to 0, 1 or 2; and
(ii) at least one, and optionally from 1 to 550 of siloxy unit(s) of formula (XL-2):

$$(Z)_g SiO_{(4-g)/2} \quad (XL-2)$$

wherein:
the symbol Z represents an alkyl having from 1 to 8 carbon atoms inclusive, and
the symbol g is equal to 0, 1, 2 or 3;
wherein Z in XL-1 and XL-2 can be the same or different.

5. The two-part curable liquid silicone rubber composition according to claim 1, wherein the at least one alkenyl group-containing organopolysiloxane A is of the following formula (1):

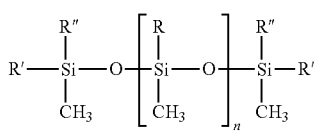

(1)

wherein:
n is an integer ranging from 1 to 1000,
R is a $C_1$ to $C_{20}$ alkyl group such as a methyl, ethyl, propyl, trifluoropropyl, or aryl group,
R' is a $C_2$ to $C_{20}$ alkenyl group such as a vinyl, allyl, hexenyl, decenyl, or tetradecenyl group, and
R" is a $C_1$ to $C_{20}$ alkyl group such as a methyl, ethyl, propyl, trifluoropropyl, or aryl group.

6. The two-part curable liquid silicone rubber composition according to claim 1 further comprising:
(G) from 0 to 2 parts by weight of at least one thickener G1 or at least one rheology modifier G2, and/or
(H) from 0 to 10 parts of at least one additive H.

7. The two-part curable liquid silicone rubber composition according to claim 1, wherein the diorganohydrogensiloxy-terminated polydiorganosiloxane CE is of the following formula (2):

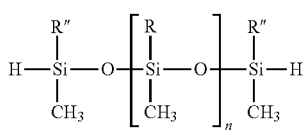

(2)

wherein:
R and R" are independent and are selected from a $C_1$ to $C_{20}$ alkyl group, and
n is an integer ranging from 1 to 500.

8. The two-part curable liquid silicone rubber composition according to claim 1, wherein the catalyst D is a platinum group metal-containing catalyst.

9. The two-part curable liquid silicone rubber composition according to claim 1, wherein the filler E is selected from the group consisting of a reinforcing filler E1, a thermally conductive filler E2, an electrically conductive filler E3, and mixtures thereof.

10. The two-part curable liquid silicone rubber composition according to claim 1, wherein the cure rate modifier F is selected from the group consisting of a crosslinking inhibitor F1 and a crosslinking retardant F2.

11. The two-part curable liquid silicone rubber composition according to claim 1, wherein the % molar ratio RCHE is within the range of 76%≤RHCE<95%.

12. The two-part curable liquid silicone rubber composition according to claim 2, wherein the ratio α is less than 0.20, and wherein the % molar ratio RCHE is within the range of 86%≤RHCE≤96%.

13. The two-part curable liquid silicone rubber composition according to claim 2, wherein the ratio α is greater than 0.22, and wherein the % molar ratio RCHE is within the range of 78%≤RHCE≤94%.

14. The two-part curable liquid silicone rubber composition according to claim 1, wherein the value of the ratio RHalk is 1.10≤RHalk<1.25.

15. A silicone elastomer having an elongation-at-break value of at least 800% measured according to ASTM D-412, which is obtained by curing the two-part curable liquid silicone rubber composition according to claim 1.

16. A silicone elastomer having an elongation-at-break value of at least 800% measured according to ASTM D-412, comprising:
(A) 100 parts by weight of at least one alkenyl group-containing organopolysiloxane A having two silicon-bonded alkenyl groups per molecule,
(B) at least one diorganohydrogensiloxy-terminated polydiorganosiloxane CE,
(C) at least one organosilicon crosslinker XL containing at least 3 silicon-bonded hydrogen atoms per molecule,
(D) at least one addition reaction catalyst D, and
(E) from 1 to 500 parts by weight of at least one filler E,
(F) from 0 to 10 parts by weight of at least one cure rate modifier F,
wherein the amounts of the alkenyl group-containing organopolysiloxane A, the diorganohydrogensiloxy-terminated polydiorganosiloxane CE, and the organosilicon crosslinker XL are determined such that:
1) the value of the ratio RHalk is 1.00<RHalk<1.35, wherein RHalk=nH/tAlk, and wherein:
nH=number of moles of hydrogen atom directly bonded to a silicon atom of said liquid silicone rubber composition X; and
tAlk=number of moles of alkenyl groups directly bonded to a silicon atom of said liquid silicone rubber composition X, and
2) the % molar ratio RHCE is within the range of 50%≤RHCE<98%, wherein RHCE=nHCE/(nHCE+nHXL)×100, and wherein:
a) nHCE is the number of moles of hydrogen atom directly bonded to a silicon atom of the diorganohydrogensiloxy-terminated polydiorganosiloxane CE, and
b) nHXL=is the number of moles of hydrogen atom directly bonded to a silicon atom of the organosilicon crosslinker XL.

17. An article, such as for a medical device comprising a cured product of the two-part curable liquid silicone rubber composition according to claim 1.

18. Method of using a cured product of the two-part curable liquid silicone rubber composition according to claim 1 in an article and/or product, such as a medical device or electronic device.

19. A method of making a silicone elastomer comprising mixing the two part curable liquid silicone rubber composition comprising a first liquid composition comprising components (A), (B), (C), (E), and (F), but not (D) and a second liquid composition comprising components (A), (E), and (D), but not (B) and not (C) and not (F), to yield a curable liquid silicone rubber composition X comprising components:
- (A) 100 parts by weight of at least one alkenyl group-containing organopolysiloxane A having two silicon-bonded alkenyl groups per molecule,
- (B) at least one diorganohydrogensiloxy-terminated polydiorganosiloxane CE,
- (C) at least one organosilicon crosslinker XL containing at least 3 silicon-bonded hydrogen atoms per molecule,
- (D) at least one addition reaction catalyst D, and
- (E) from 1 to 500 parts by weight of at least one filler E,
- (F) from 0 to 10 parts by weight of at least one cure rate modifier F, wherein A can be the same or different in the first and second liquid compositions, and wherein E can be the same or different in the first and second liquid compositions, wherein the amounts of the alkenyl group-containing organopolysiloxane A, the diorganohydrogensiloxy-terminated polydiorganosiloxane CE, and the organosilicon crosslinker XL are determined such that:

1) the value of the ratio RHalk is $1.00 < \text{RHalk} < 1.35$, wherein $\text{RHalk} = \text{nH}/\text{tAlk}$, and wherein:

nH=number of moles of hydrogen atom directly bonded to a silicon atom of said liquid silicone rubber composition X; and tAlk=number of moles of alkenyl groups directly bonded to a silicon atom of said liquid silicone rubber composition X, and 2) the % molar ratio RHCE is within the range of $50\% \leq \text{RHCE} < 98\%$, wherein $\text{RHCE} = \text{nHCE}/(\text{nHCE} + \text{nHXL}) \times 100$, and wherein:

a) nHCE is the number of moles of hydrogen atom directly bonded to a silicon atom of the diorganohydrogensiloxy-terminated polydiorganosiloxane CE, and b) nHXL=is the number of moles of hydrogen atom directly bonded to a silicon atom of the organosilicon crosslinker XL, and curing the curable liquid silicone rubber composition X to yield the silicone elastomer having an elongation-at-break value of at least 800% measured according to ASTM D-412.

20. A method of forming a three-dimensional (3D) article, said method comprising:
- i) printing a first heat-curable silicone composition with a 3D printer to form a layer;
- ii) heating the layer to form an at least partially cured layer;
- iii) printing a second heat-curable silicone composition on the at least partially cured layer with the 3D printer to form a subsequent layer;
- iv) heating the subsequent layer to form an at least partially cured subsequent layer; and
- v) optionally, repeating steps iii) and iv) with independently selected heat-curable silicone composition(s) for any additional layer(s) to form the 3D article;

wherein the first and second heat-curable silicone compositions are the same as or different from one another, and wherein at least one of the first and second heat-curable silicone compositions is the curable liquid silicone rubber composition X as claimed in claim 1.

* * * * *